United States Patent
Adams et al.

(10) Patent No.: US 9,457,858 B2
(45) Date of Patent: Oct. 4, 2016

(54) MOUNTED CHILD BICYCLE SEAT ASSEMBLY

(71) Applicants: Lewis R Adams, Battle Creek, MI (US); Larry D Gamble, Albion, MI (US)

(72) Inventors: Lewis R Adams, Battle Creek, MI (US); Larry D Gamble, Albion, MI (US)

( * ) Notice: Subject to any disclaimer, the term of this patent is extended or adjusted under 35 U.S.C. 154(b) by 0 days.

(21) Appl. No.: 14/504,561

(22) Filed: Oct. 2, 2014

(65) Prior Publication Data

US 2016/0096569 A1   Apr. 7, 2016

(51) Int. Cl.
*B62J 1/16* (2006.01)
*B62J 1/14* (2006.01)

(52) U.S. Cl.
CPC .. *B62J 1/167* (2013.01); *B62J 1/16* (2013.01)

(58) Field of Classification Search
CPC ............ B62J 1/08; B62J 1/167; B62J 1/165; B62J 1/162; B62J 1/16
USPC .................................................. 297/195.13
See application file for complete search history.

(56) References Cited

U.S. PATENT DOCUMENTS

| | | | | |
|---|---|---|---|---|
| 2,448,867 A * | 9/1948 | Darden | ............ | B62J 1/167 280/202 |
| 2,517,957 A * | 8/1950 | Anderson | ............ | B62J 1/167 224/415 |
| 2,550,200 A * | 4/1951 | Murrell | ............ | B62J 1/167 248/214 |
| 3,619,003 A * | 11/1971 | Rich, Jr. | ............ | B62J 1/16 297/195.13 |
| 3,743,321 A * | 7/1973 | Luschen | ............ | B62J 1/167 280/202 |
| 3,902,737 A | 9/1975 | Berger et al. | | |
| 4,305,532 A | 12/1981 | Reminger | | |
| 4,632,453 A | 12/1986 | Robbin et al. | | |
| 4,969,658 A * | 11/1990 | Levarek | ............ | B62J 1/167 280/202 |
| 4,998,744 A * | 3/1991 | Drexler | ............ | B62J 1/16 280/202 |
| 5,104,188 A | 4/1992 | Jefferson | | |
| 5,330,215 A | 7/1994 | Bishaf et al. | | |
| 5,927,801 A | 7/1999 | Miree | | |
| 6,264,223 B1 * | 7/2001 | Loewke | ............ | B62J 1/16 224/426 |
| 7,044,541 B1 | 5/2006 | Eissinger et al. | | |
| 7,331,595 B2 * | 2/2008 | Ray | ............ | B62J 1/167 280/288.4 |
| 8,640,935 B2 | 2/2014 | Hagedoorn | | |
| 2007/0114821 A1 * | 5/2007 | Sosa, III | ............ | B62J 1/167 297/195.13 |

FOREIGN PATENT DOCUMENTS

| | | | | |
|---|---|---|---|---|
| CH | 225910 A * | 2/1943 | ............ | B62J 1/165 |
| DE | 431820 C * | 7/1926 | ............ | B62J 1/167 |
| GB | 834948 A * | 5/1960 | ............ | B62J 1/167 |
| GB | 2474731 A * | 4/2011 | ............ | B62J 1/167 |
| WO | WO 2009079816 A1 * | 7/2009 | ............ | B62J 1/167 |

\* cited by examiner

*Primary Examiner* — David R Dunn
*Assistant Examiner* — Tania Abraham
(74) *Attorney, Agent, or Firm* — The Keys Law Firm PLLC

(57) ABSTRACT

A mounted child bicycle seat assembly for providing a selectively attachable auxiliary seat for a conventional bicycle that is in front of the base bicycle seat. The mounted child bicycle seat assembly includes an attachable seat having a seat portion for receiving the rear of a passenger and an attachment pole that attaches to a clamp assembly, defined by a upper clamp section, a lower clamp section and two clamp screws, connected to a bracket assembly that is defined by two mirror image elongated bracket members, each having a foot peg extending therefrom. The mounted child bicycle seat assembly attaches to the top tube of the frame of a conventional bicycle, in front of its base bicycle seat, thereby enabling a smaller passenger, such as a child to ride in front of the rider on the base bicycle seat on the attachable seat.

5 Claims, 3 Drawing Sheets

MOUNTED CHILD BICYCLE SEAT ASSEMBLY

BACKGROUND OF THE INVENTION

1. Field of the Invention

This invention relates generally to auxiliary bicycle seating and, more particularly, to a an auxiliary bicycle seat assembly adapted to mount in front of the primary seat.

2. Description of the Prior Art

The design and use of conventional bicycles as a human powered, pedal driven single track vehicle is well known. As it is common for parents desire to take small children with them when riding bicycles, many attempts have been made to design integrated or attachable auxiliary seating for conventional bicycles. A problem which still exists, however, is that such auxiliary seats, typically seen as toddler seats are sized for smaller children and solely configured to attach behind the primary seat of the rider. If a child is too big for such a toddler seat but still not old enough to ride their own bike, there are presently limited options to allow the child to come along with the parent. Thus, there remains a need for a mounted child bicycle seat assembly which would allow the placement of an additional conventional style bicycle seat on a bicycle. It would be helpful if such a mounted child bicycle seat assembly enabled the additional seat to be placed in front of the base bicycle seat. It would be additionally desirable for such a mounted child bicycle seat assembly to include foot stands that provide a location for the feet of a child in the seat to be placed.

The Applicant's invention described herein provides for a mounted child bicycle seat assembly adapted to attach to a conventional bicycle to provide a second bicycle seat. The primary components in Applicant's mounted child bicycle seat assembly are a seat, clamp assembly, and bracket assembly. When in operation, the mounted child bicycle seat assembly enables a child to ride on a separate, attachable seat on a bicycle in front of the pedaling rider. As a result, many of the limitations imposed by prior art structures are removed.

SUMMARY OF THE INVENTION

A mounted child bicycle seat assembly for providing a selectively attachable auxiliary seat for a conventional bicycle that is in front of the base bicycle seat. The mounted child bicycle seat assembly includes an attachable seat having a seat portion for receiving the rear of a passenger and an attachment pole that attaches to a clamp assembly, defined by a upper clamp section, a lower clamp section and two clamp screws, connected to a bracket assembly that is defined by two mirror image elongated bracket members, each having a foot peg extending therefrom. In this regard, the clamp assembly provides a clamping means for attaching to the top tube of a bicycle frame, the attachable seat provides a seating means for receiving the rear of a passenger and connecting to said clamp assembly, and the bracket assembly provides a bracket means for providing a foot rest. The mounted child bicycle seat assembly attaches to the top tube of the frame of a conventional bicycle, in front of its base bicycle seat, thereby enabling a smaller passenger, such as a child to ride in front of the rider on the base bicycle seat on the attachable seat.

It is an object of this invention to provide a mounted child bicycle seat assembly which would allow the placement of an additional conventional style bicycle seat on a bicycle.

It is another object of this invention to provide a mounted child bicycle seat assembly that enables the additional seat to be placed in front of the base bicycle seat.

It is yet another object of this invention to provide a mounted child bicycle seat assembly that includes foot stands that provide a location for the feet of a child in the seat to be placed.

These and other objects will be apparent to one of skill in the art.

DETAILED DESCRIPTION OF THE INVENTION

Figure 1:
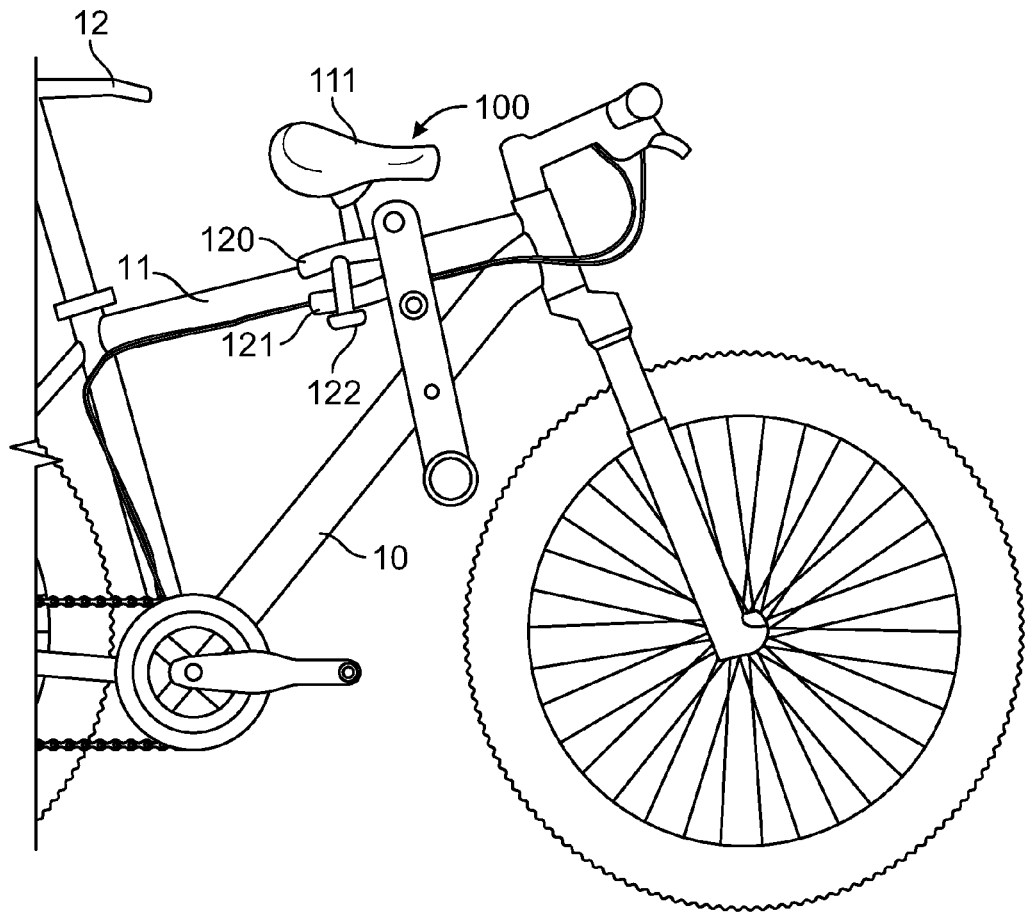
FIG. 1 is a side elevational view of a mounted child bicycle seat assembly disposed on a conventional bicycle in accordance with the present invention.
Figure 2:
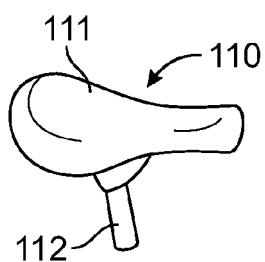
FIG. 2 is a side perspective view of the seat of a mounted child bicycle seat assembly built in accordance with the present invention.
Figure 3A:
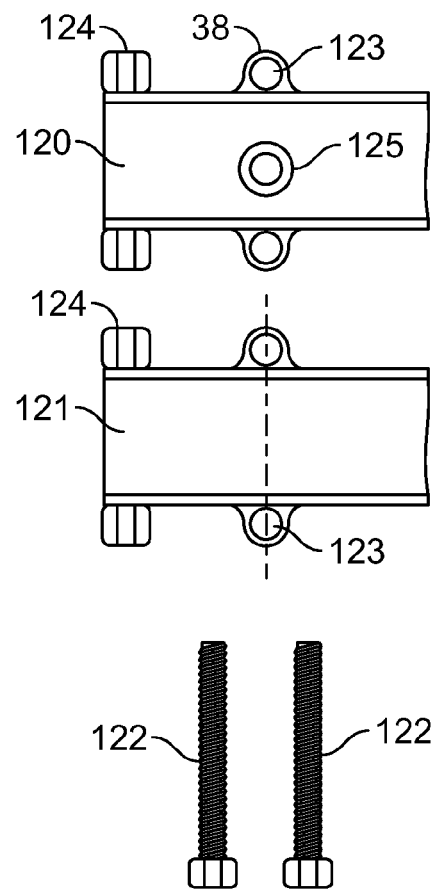
FIG. 3A is a top plan view of the clamp assembly parts of a mounted child bicycle seat assembly built in accordance with the present invention.
Figure 3B:
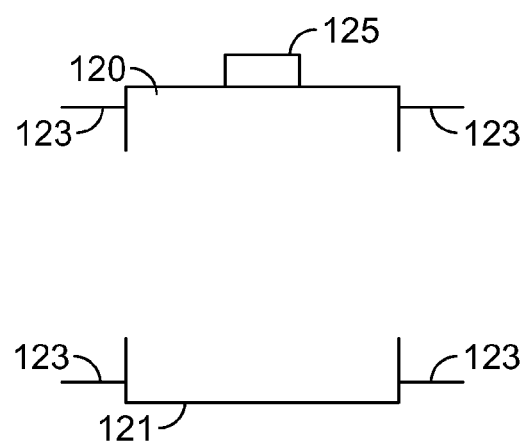
FIG. 3B is a side cross-sectional view of the upper clamp section and lower clamp section of the clamp assembly of a mounted child bicycle seat assembly built in accordance with the present invention
Figure 4A:
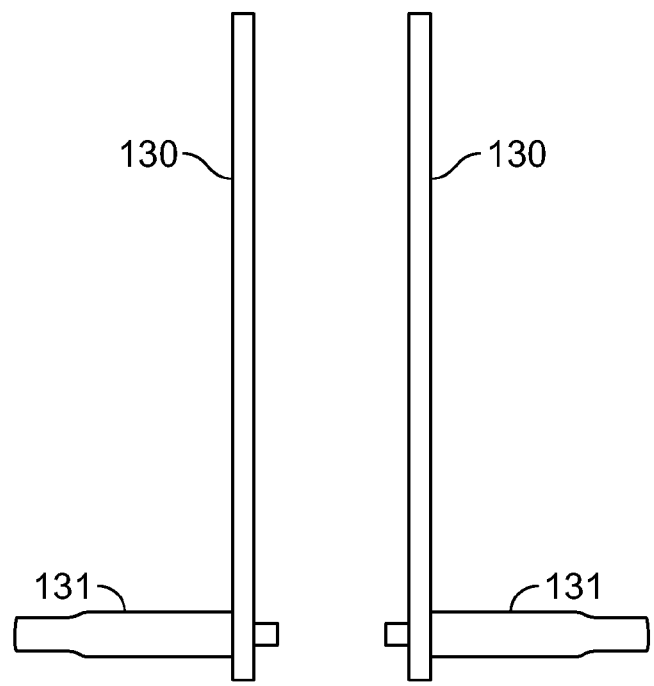
FIG. 4A is a front elevational view of the bracket assembly parts of a mounted child bicycle seat assembly built in accordance with the present invention.
Figure 4B:
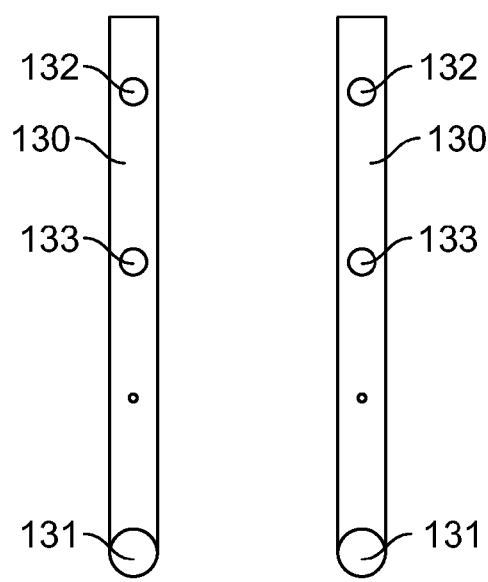
FIG. 4B is a side elevational view of the bracket assembly parts of a mounted child bicycle seat assembly built in accordance with the present invention.

Referring now to the drawings and in particular FIGS. 1 and 2, a mounted child bicycle seat assembly 100 is defined by an attachable seat 110 attached to a clamp assembly connected to a bracket assembly. The mounted child bicycle seat assembly 100 is shown attached to the top tube 11 of the frame of a conventional bicycle 10, in front of its base bicycle seat 12, thereby enabling a smaller passenger, such as a child to ride in front of the rider on the base bicycle seat 12 on the attachable seat 110. The attachable seat 110 includes a seat portion 111 for receiving the rear of a passenger and an attachment pole 112 for connecting it to the clamp assembly, as described in greater detail below.

Referring now to FIGS. 1, 3A, 3B, 4A and 4B, the clamp assembly defines an upper clamp section 120, a lower clamp section 121 and two clamp screws 122. The upper clamp section 120 and lower clamp section 121 are identically shaped elongated bodies. The upper clamp section 120 and lower clamp section 121 each include two side screw holes 123 for receiving a clamp screw 122 and a bracket attachment screw 124 at one end for connecting the components of the bracket assembly thereto. The upper clamp section 120 additionally receives a seat mount hole 125 extending from one side that engages and secures the attachment pole 112 of the attachable seat 110.

The clamp assembly is connected to the top tube 11 of a bicycle by placing the upper clamp section 120 on the top side of the top tube 11 and the lower clamp section 121 on the underside of the top tube 11. Then, the clamp screw 122 are passed through the side screw holes 123 on the lower clamp section 121 to and through the side screw holes 123 on the upper clamp section 120, and tightened so that the upper clamp section 120 and the lower clamp section 121 are held firmly against the top tube 11. The attachment seat 110 can then be attached to the upper clamp section 120 by inserting the attachment pole 112 into the seat mount hole 125.

The bracket assembly includes two mirror image elongated bracket members 130, each having a foot peg 131 extending therefrom. The bracket members 130 additionally include an upper bracket aperture 132 and a lower bracket aperture 133 for enabling attachment of the bracket members to the upper clamp section 120 and lower clamp section 121, respectively. Specifically, each bracket members 130 is attached to the clamp assembly by engaging the bracket attachment screw 124 on the upper clamp assembly 120 with the upper bracket aperture 132 and the bracket attachment screw 124 on the lower clamp assembly 121 on the same side of the bicycle with the lower bracket aperture 133.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A mounted child bicycle seat assembly for mounting to the frame of a bicycle, comprising:
   a clamp assembly defining an upper clamp section and a lower clamp section, each adapted to be secured to a top tube of a bicycle frame;
   an attachable seat connected to said clamp assembly, positioned to extend up from the top tube of the bicycle frame;
   a bracket assembly defining two elongated bracket members, each having a foot peg extending therefrom, wherein the bracket assembly is connected to said clamp assembly; and
   said upper clamp section and lower clamp section each including a bracket attachment screw and each of said bracket members are connected to the bracket attachment screw on both the upper clamp section and lower clamp section.

2. The mounted child bicycle seat assembly for mounting to the frame of a bicycle of claim 1, wherein the attachable seat includes a seat portion for receiving the rear of a passenger and an attachment pole for connecting to said clamp assembly.

3. The mounted child bicycle seat assembly for mounting to the frame of a bicycle of claim 2, wherein the upper clamp section includes a seat mount hole and said attachable seat is connected to the clamp assembly by the attachment pole engaging the seat mount hole.

4. The mounted child bicycle seat assembly for mounting to the frame of a bicycle of claim 1, wherein the upper clamp section and lower clamp section each include a side screw hole on each side.

5. The mounted child bicycle seat assembly for mounting to the frame of a bicycle of claim 4, wherein said upper clamp section and lower clamp section are secured on opposing sides of the top tube of a bicycle frame by engaging the side screw holes of both the upper clamp section and lower clamp section with a clamp screw.

* * * * *